United States Patent [19]
Noll

[11] 3,833,230
[45] Sept. 3, 1974

[54] VACUUM CHUCK
[75] Inventor: Burton A. Noll, Painted Post, N.Y.
[73] Assignee: Corning Glass Works, Corning, N.Y.
[22] Filed: Sept. 13, 1973
[21] Appl. No.: 396,751

[52] U.S. Cl............................ 279/3, 51/235, 269/21, 294/64 R
[51] Int. Cl............................................ B23b 31/30
[58] Field of Search................ 279/3, 1 J; 294/64 R; 269/21; 51/235

[56] References Cited
UNITED STATES PATENTS
| | | | |
|---|---|---|---|
| 2,895,739 | 7/1959 | Smith | 279/3 |
| 3,165,899 | 1/1965 | Shatto, Jr. | 294/64 R |
| 3,711,142 | 1/1973 | Wolski | 294/64 R |

*Primary Examiner*—Andrew R. Juhasz
*Assistant Examiner*—Z. R. Bilinsky
*Attorney, Agent, or Firm*—Charles W. Gregg; Clarence R. Patty, Jr.

[57] ABSTRACT

A vacuum chuck for picking up and handling articles having relatively flat or slightly curved surfaces to be contacted by the vacuum cup of the chuck with a modified form of gimbaling arrangement permitting self-leveling or rocking floating movement of the chuck and the suction cup to adjust to a contacted surface when a preselected value of vertical force is applied to the chuck, and a locking or clamping feature to prevent floating movement or rocking motion of the chuck and vacuum cup when said preselected force is absent or terminated.

10 Claims, 2 Drawing Figures

VACUUM CHUCK

BACKGROUND OF THE INVENTION

It is oftentimes desired to pick up articles having flat or somewhat curved surfaces of a relatively large areal expanse and to transfer such articles from one location or work station to another for work to be performed thereon. For example, viewing panels for cathode ray or television picture tubes often comprise face plates having depending skirt portions with lower annular edges which are ground in preparation for sealing thereof to complemental large ends of funnel parts for the cathode ray or picture tubes. For obvious economic reasons it is desirable that the pickup, handling and transfer of each such a viewing panel to and from the grinding apparatus is performed as automatically as possible, that is, with the least amount of manual handling of the viewing panel. It is, accordingly, an object of the present invention to provide a new and novel form of vacuum chuck which is suitable for picking up and handling articles of the class mentioned as well as other types of articles which have flat or somewhat curved surfaces of a relatively large areal expanse.

It is another object of the present invention to provide a vacuum chuck which is, at times, permitted to rock or wobble to permit an article picked up thereby to self-level or to adjust to a surface contacted thereby and which, at other times such as during transfer of such an article from one location to another, is locked or clamped against rocking or wobbling motion to prevent the article being transferred from correspondingly rocking, or wobbling, and thus possible inadvertently striking against apparatus or parts thereof which may be adjacent or along side the path of transfer of the article.

It is still another object of the invention to provide a vacuum chuck which is of a relatively simple construction and includes a novel form of a gimbaling arrangement for self-leveling or rocking or wobble movement of the chuck while providing for automatic locking or clamping against such movement at certain times.

Other objects and characteristic features of the invention will become apparent as the description proceeds.

SUMMARY OF THE INVENTION

The invention is believed to be sufficiently summarized in the foregoing abstract of the disclosure and, therefore, to prevent redundancy or repetition and for the sake of brevity to the extent possible, no further summary of the invention will be given nor is any considered to be necessary.

BRIEF DESCRIPTION OF THE DRAWINGS

In the Drawings.

Similar reference characters refer to similar parts in each of the figures of the drawings.

PREFERRED EMBODIMENT OF THE INVENTION

Figure 1:
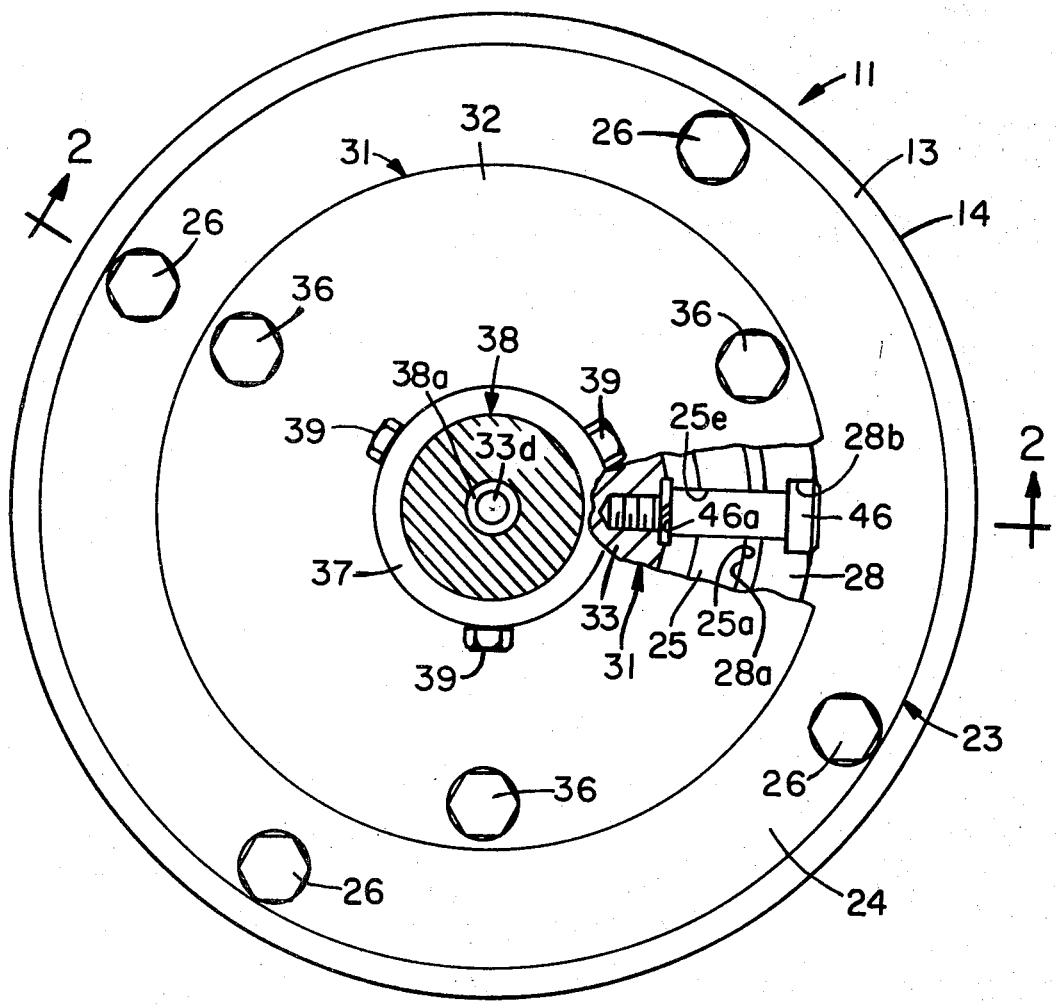
FIG. 1 is a top plan view of a vacuum chuck embodying the invention with a minor portion of part of the chuck cut away to illustrate several details thereof.
Figure 2:
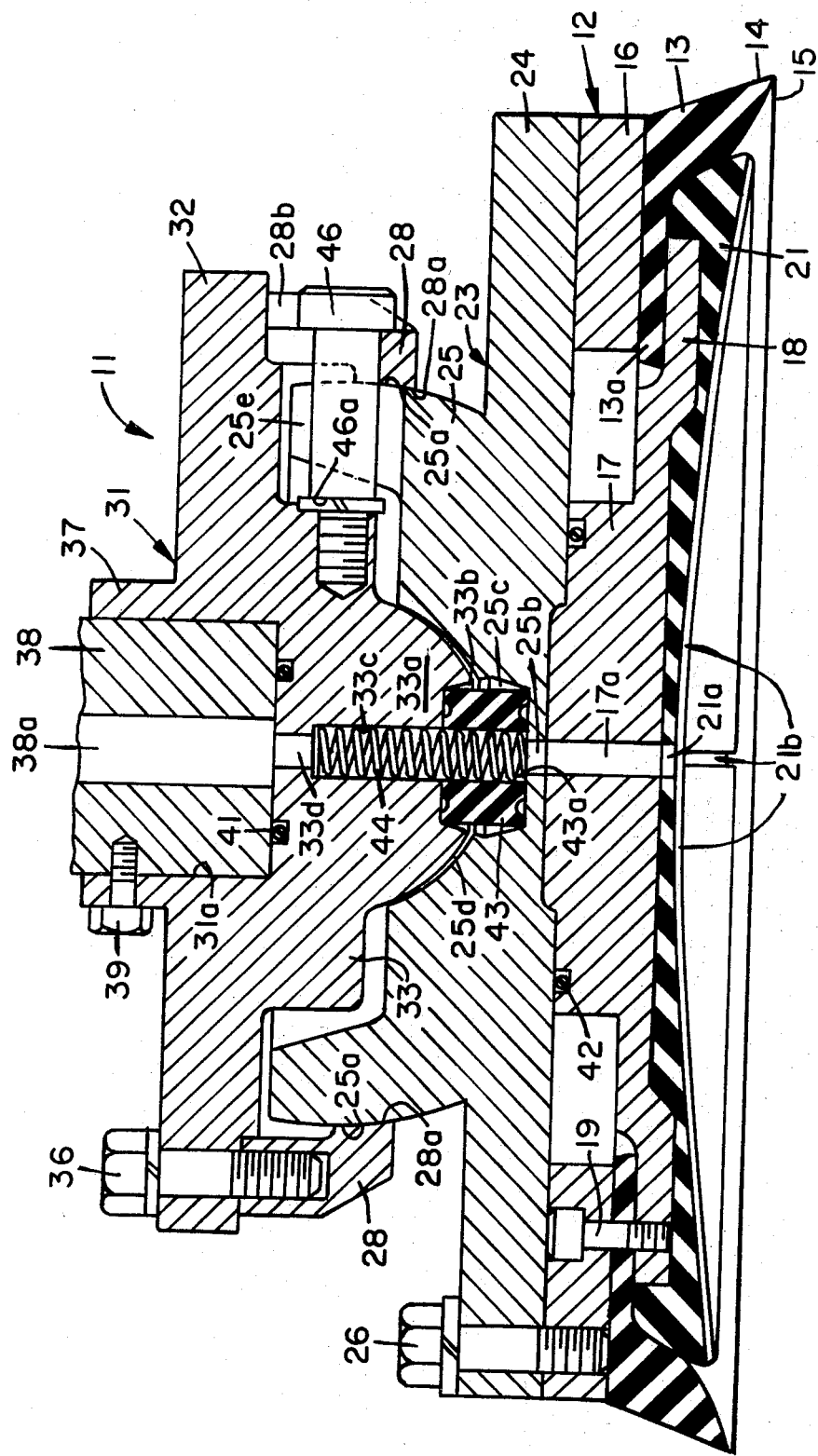
FIG. 2 comprises a cross-section elevational view of the vacuum chuck of FIG. 1, such view being taken generally along line 2—2 of FIG. 1.

Referring to the drawings in detail there is shown in FIGS. 1 and 2 a vacuum chuck 11 including a generally horizontally extending and circular vacuum cup assembly 12 (as best illustrated in FIG. 2) and including a circular or annular outer member 13 of a resilient material, such as rubber, having an outer pendant annular lip 14 with a lower brim 15 (FIG. 2) for contacting a relatively flat or slightly curved surface of an article to be handled. Assembly 12 further includes an annular clamping member 16 surrounding a center member 17 having a lower outwardly extending and clamping flange portion 18. An inner portion 13a of resilient member 13 is located between the lower surface of member 16 and the upper surface of portion 18 of member 17, and is clamped therebetween by a plurality of allen screws such as 19 which extend downwardly through suitable holes in annular member 16 and portion 13a of resilient member 13. Such screws are screwed into suitably threaded holes in portion 18 of member 17 as illustrated in FIG. 2 and the screws may, for example, be six in number and evenly spaced annularly about member 16 and said portions 13a and 18 of members 13 and 17, respectively. However, for purposes of simplification of the drawings only one screw such as 19 is shown in FIG. 2 of the drawings. Member 17 further embodies at the center thereof a vacuum passage 17a extending vertically through such member.

Member 17 preferably, but not necessarily, has secured to its lower surface, as by being bonded thereto by a suitable cement, glue or other adhesive, a circular pad 21 of a resilient material, such pad embodying a center vertical vacuum passage 21a and, in the bottom surface thereof, a plurality of vacuum channels such as 21b which connect the lower end of vacuum passage 21a with the outer perimeter of pad 21. Center passage 21a joins at its upper end with the lower end of the aforesaid vacuum passage 17a embodied in member 17. Pad 21 is shown as extending to and contacting the inner periphery of depending lip portion 14 of member 13 and the purpose of such pad, when included, will be discussed hereinafter in an operational example of the invention.

A vacuum cup assembly support member 23 includes a lower horizontally extending flange portion 24 whose lower surface abuts against the upper surfaces of members 16 and 17 of vacuum cup assembly 12, such flange portion being secured to member 16 by four bolts such as 26 which extend downwardly through four complemental holes evenly spaced apart about and adjacent to the outer periphery of said flange portion 24 of support member 23, the threaded lower ends of said bolts being screwed into cooperatively threaded holes embodied in member 16 of assembly 12 as illustrated in FIG. 2. Support member 23 also includes a center and generally vertically extending bowl shaped portion 25 with an outer curved surface 25a having a geometric configuration of a center segment of a sphere.

There is embodied in the bottom wall of portion 25 of support member 23, a vertically extending center passage 25b which is coaxial with and has its lower end joining with the upper end of said center passage 17a in member 17 of vacuum cup assembly 12. The upper end of passage 25b joins with the lower end of a cavity 25c also embodied in the bottom wall of bowl shaped portion 25 of support member 23 and having a generally circular periphery of a relatively large diameter which preferably increases slightly from the bottom of such cavity towards the upper open end thereof. The center of circular cavity 25c is coaxial with the center of said passage 25b embodied in the bottom wall of portion 25 of member 23. The bottom wall of portion 25 of member 23 also embodies, above cavity 25c, a semispherical cavity 25d having an open horizontal upper end of a larger diameter than that of circular cavity 25c and a truncated lower end which joins with the upper end of such circular cavity with the centers of such upper and lower ends coaxial with the vertical center line of the circular cavity.

A generally horizontally disposed annulus 28 has an inner surface 28a which curvingly tapers downward correspondingly and complemental to a part of said outer curved surface 25a of portion 25 of member 23, said inner surface 28a of annulus 28 and said part of the outer surface 25a of portion 25 being, at times, in contact with each other for support of member 23 and, thereby of vacuum cup assembly 12. This will be discussed further hereinafter in an operational example of the invention.

A support member 31 for annulus 28 is provided and includes an upper horizontally or outwardly extending flange portion 32, an annular part of whose lower surface adjacent the outer periphery of the flange portion abuts against the upper surface of annulus 28, such annulus and flange portion being secured to each other by three threaded and equally spaced apart bolts such as 36 which extend downwardly through suitable holes provided in flange portion 32 and are screwed into cooperatively threaded holes provided in annulus 28. Support member 31 also includes a center and somewhat downwardly extending portion 33 having a semispherical lower part 33a with a geometric outer configuration or surface corresponding and complemental to said semispherical cavity 25d embodied in portion 25 of member 23, such semispherical part 33a extending into such semispherical cavity 25d and, at times, cooperative with the surface defining the limits of such cavity to provide therewith a ball-and-socket joint arrangement. This will also be further discussed hereinafter in an operational example of the invention.

Said center portion 33 of member 31, embodies in semispherical lower part 33a of such center portion, a center cavity 33b which extends upwardly in the semispherical lower part 33a and has a generally circular periphery with a large open lower end generally corresponding in diameter to the upper open end of cavity 25c in bowl shaped portion 25 of support member 23, such center cavity 33b preferably tapering slightly in diameter towards the upper closed end thereof and the open ends of said cavities facing each other with the vertical center lines of the cavities being coaxial. An intermediate size center passage 33c, that is a passage having a diameter greater than the diameters of the aforesaid passages 17a and 25b but less than the diameters of the circular cavities 25c and 33b, extends upwardly and substantially or almost through center portion 33 of member 31, such center passage 33c joining at its lower end with the upper end of circular cavity 33b coaxially therewith and at its upper end coaxially with a short length passage 33d extending upwardly through the remainder of said center portion 33 of member 31 and having a diameter smaller than passage 33c, the line of juncture of passages 33c and 33d providing a shoulder at the upper end of passage 33c for purposes discussed hereinafter.

The lower end of a vertical disposed rotational circular shaft 38 is shown in FIGS. 1 and 2, such shaft embodying therein a vertical vacuum passage 38a extending longitudinally therethrough. The details per se of shaft 38 form no part of the present invention but the lower end such shaft is shown for purposes of making the disclosure complete. It will be readily understood that shaft 38 is pendantly supported, in any of the well-known manners, so that vacuum can be selectively supplied to passage 38a therein and so that rotation or rotational motion can be imparted to the shaft if, and when, so desired. This will be readily apparent to those skilled in the art.

Member 31 further includes, at the center of its upper surface, an upwardly extending hollow flange or collar 37 surrounding the upper end of a circular recess 31a embodied in the upper wall of member 31, such recess and collar having inner diameters corresponding to the outer diameter of shaft 38 and into which the lower end of such shaft snugly extends with the lower end of vacuum passage 38a in the shaft joining with the upper end of passage 33d in member 31. Three threaded bolts such as 39 extend through three suitable horizontal holes equally spaced apart about the circumference of said collar 37 and the bolts such as 39 are screwed into cooperatively threaded holes provided in shaft 38 as best illustrated in FIG. 2. Any rotational motion supplied or imparted to shaft 38 will thus be similarly imparted to support member 31 and, as discussed hereinafter, to the remainder of vacuum chuck 11.

It is believed expedient to here point out that the arc of curvature of surface 25a of portion 25 of member 23, and the arc of curvature of the surface of semispherical part 33a of center portion 33 of member 31, as well as the arc of curvature of the semispherical cavity 25d in said portion 25 of member 23, all have a geometrically common center point when the parts in their relative positions shown in FIG. 2, such center point lying on the vertical centerline of passage 33c extending through the center portion 33 of member 31. Such is highly desirable but is not absolutely essential to the invention.

It is also believed expedient to now point out that an O-ring 41 of a resilient material such as rubber is provided between the bottom annular surface of shaft 38 and the surface defining the lower limits of recess 31a in member 31, such O-ring being disposed in a suitable annular channel and providing hermetical sealing between said surfaces and, thereby, between the aforesaid vacuum passages 33d and 38a. Similarly, a rubber O-ring 42 is provided between the lower surface of support member 23 and the upper surface of member 17 of assembly 12, such O-ring being disposed in a suitable annular channel to provide hermetic sealing between said surfaces and, thereby, between vacuum passages 17a and 25b. A relatively thick annular plug, washer or O-ring 43 of a resilient material such as rubber is disposed in circular cavities 25c and 33b, with the lower and upper surfaces of such plug firmly contacting the surfaces defining the lower and upper limits of cavities 25c and 33b, respectively. Such plug provides hermetic sealing between passages 25b and 33c. A circular hole or passage 43a is embodied in and extends vertically through plug 43, such hole being of a diameter generally corresponding with the diameter of passage 33c in center portion 33 of support member 31 and coaxial with such passage 33c.

A partially compressed helical coil spring 44 is disposed in said passage 33c and hole or passage 43a in plug 43 and the upper end of said spring bears firmly against the previously mentioned shoulder at the juncture of the lower end of passage 33d and the upper end of passage 33c embodied in center portion 33 of member 31. The lower end of spring 44 bears firmly against an annular portion of the surface defining the lower limits of cavity 25c in portion 25 of support member 23, such annular portion surrounding the upper end of passage 25b in said portion 25. The purpose of spring 44 will also be discussed hereinafter in an operational example of the invention.

When rotation or rotational motion is imparted to shaft 28, it is desired that such rotation also be imparted to vacuum cup assembly 12 and to any article then supported thereby. For such purpose, a drive arrangement including an allen screw 46 having a shank threaded for only a smaller part of the length thereof, that is, only up to a shoulder 46a on such shank, is screwed into a cooperatively threaded hole provided in the outer periphery of portion 33 of support member 31. The head of such screw fits relatively snugly into an outer larger part of a stepped cutout or channel 28b embodied or extending downwardly into annulus 28, and a first part of the smooth length of the shank, adjacent the head of the screw 46, extends relatively snugly and horizontally through the smaller inner part of said cutout or channel 28b. A second part of the smooth length of the shank of screw 46 extending between said first part and said shoulder 46a on the shank of the screw, extends relatively snugly through a cutout or channel 25e embodied or extending downwardly into the upwardly extending wall of the bowl shaped center portion 25 of support member 23. This arrangement will be readily apparent from a brief glance at FIGS. 1 and 2 of the drawings. It is pointed out that another rotational drive arrangement similar to that just described is preferably also provided diametrically opposite the described drive arrangement but, for purposes of simplification of the drawings, such arrangement is not shown therein. It is also pointed out that a rotational drive arrangement such as shown and described provides for driven rotation of support member 23 and vacuum cup assembly 12 in unison with rotation of rotational shaft 38 and support member 31 while, at the same time, permitting the previously mentioned floating, wobbling or rocking movement of member 23 and the supported vacuum cup assembly 12.

Briefly outlining the structure of the novel vacuum chuck disclosed, such chuck may be described as having a horizontal vacuum cup assembly 12 and a vertical rotational shaft 38 with an arrangement of parts coupling said assembly and said shaft, such arrangement including an outer ball-and-socket joint gimbaling means with cooperative surfaces 25a and 28a which at times are locked or clamped to each other, an inner ball-and-socket joint vertically between said lower end of said shaft and said vacuum cup assembly with the outer curved surface of part 33a of portion 33 of support member 31 being cooperative with and complemental to the curved surface defining the limits of cavity 25d in portion 25 of support member 23, means for keying members 23 and 32 to each other to impart any rotational motion of shaft 38 to vacuum cup assembly 12, and a plurality of vacuum passages 25b, 43a, 33 c and 33d hermetically joining with each other, and with the lower end of a vacuum passage 38a in shaft 38 and the upper end of a vacuum passage 17a embodied in vacuum cup assembly 12.

Operational Example of the Invention

In describing the operation of the vacuum chuck disclosed, it will first be assumed that shaft 38 is pendantly supporting the remaining parts of the chuck with such remaining parts, in effect, pendantly hanging in mid-air as shown in FIG. 2. At such time, the weight of support member 23 and vacuum cup assembly 12, that is, the force of gravity on such parts, summed with a downward force thereon produced by the partial compression of spring 44 within passages 33c and 43a, produces a resultant downward force which presses convexly curved surface 25a of portion 25 of support member 23 tightly against concavely curved surface 28a of annulus 28, that is, into a tight frictional contact with said surface 28a thereby effectively locking or clamping support member 23 and vacuum cup assembly 12 against any movement relative to annulus 28 and member 31, that is, against any floating, wobbling or rocking movement of such member 23 and such assembly 12 in relation to annulus 28 and support member 31.

It will now be assumed that chuck 11 is lowered by shaft 38 towards and into contact with an upwardly disposed flat or slightly curved surface of an article, such surface having a larger areal expanse than the areal expanse that can be spanned by the lower brim 15 of depending lip 14 of suction cup 13, that is to say, a surface having an areal expanse such that it will contact all along said brim 15 even when such brim is spread outwardly by a vertical force supplied thereto. Subsequent to the time said brim 15 contacts said upper surface and sufficient downward force is supplied to such brim to effect a hermetic seal between the brim and the contacted upper surface, negative pressure or vacuum is supplied to passage 38a in shaft 38 and, thence, through the other passages embodied in the vacuum chuck to the contacted upper surface of said article. Such vacuum or negative pressure is of a value to overcome the weight of the contacted article, that is, is of a value such that the article can be picked up by the vacuum chuck. However, the value of the vacuum or negative pressure must not be such that the force supplied to said article by such vacuum and, thereby, to vacuum cup assembly 12 and support member 23, is sufficient to also overcome the weight of such member and assembly and the additional downward force supplied thereto by spring 44. If said negative pressure were of a value to supply such a force, surface 25a of member 23 would move out of contact with surface 28a of annulus 28 and the aforesaid clamping or locking of such members would be terminated. It will be assumed then that the value of the negative pressure supplied to the upper surface of the article to be picked up in sufficient to overcome the weight of the article with, of course, a suitable margin of extra pressure provided, but that such pressure is not of a value such that the above mentioned unlocking or unclamping will occur.

Following the above discussing picking up of said article, shaft 38 is actuated upwardly so that the article is completely in the clear of whatever was supporting the article prior to the pickup thereof. Assuming, for example, that the article is to be transferred to a work station for grinding of a lower part of surface thereof, shaft 38 is moved to correspondingly move chuck 11 to transfer the article as desired and such shaft then lowers to rest said lower part or surface of the article on the grinding apparatus or wheels for grinding thereof.

During a grinding operation such as that mentioned above, it is usually desired or required that a certain amount of downward force be supplied to the article while such article is permitted to rock or wobble to a limited extent to provide for optimum grinding operations thereon. Accordingly, such a downward force is axially supplied to shaft 38 and, thereby, to chuck 11. Since, at such time, the weight of support member 23, and of vacuum cup assembly 12 and the article supported thereby, may be resting on and supported by the grinding apparatus or wheels, said axial downward force may have a minimum value sufficient only to compress resilient plug 43 and further compress spring 44 to reduce the frictional force between the contacting surfaces 25a and 28a of portion 25 of member 23 and of annulus 28, respectively, to a sufficient extent that member 23 is unlocked or unclamped and can rock or wobble to a limited extent with respect to annulus 28 and member 31. However, said downward axial force may be substantially greater than said minimum value thereof, or it may be required that such axial force be substantially greater in order to provide the proper grinding operation on said article. Such greater axial force moves said surfaces 25a and 28a completely out of contact with each other, and the lower surface of part 33a of portion 33 of support member 31 into contact with the truncated semispherical surface defining cavity 25d in support member 23, thereby providing for ball-and-socket joint movement between such latter surfaces and the desired rocking or wobbling motion of the supported article while the greater axial force supplied downwardly to shaft 38 and, thereby, to member 23 and vacuum cup assembly 12, is also supplied to the supported article. It will be understood that vacuum or negative pressure is, at such time, continued to be supplied to passage 38a and thence to the upper surface of the article on which the grinding operations are being performed. If shaft 38 is rotated at such time, as is oftentimes desired during grinding operations, such rotational movement is imparted to member 23 by the aforesaid allen screws such as 46 which bear against the sides of the cutouts or channels such as 25e provided in the upper part of portion 25 of member 23. Such rotational movement is, of course, also imparted to an article supported at such time, by the vacuum cup assembly 12.

Following the completion of the desired work or operation on a supported article, any rotation of shaft 38 is first preferably terminated and such shaft is then moved upwardly for another transfer of the supported article. Such upward movement initially moves the aforesaid facing surfaces of part 33a and cavity 25d out of contact with each other and, subsequently, the aforesaid surfaces 25a and 28a again into contact with one another to again clamp or lock member 23 and, thereby, vacuum cup assembly 12 and the supported article, against rocking or wobbling movement. Such clamping or locking is especially necessary at such time in order to prevent said article from tilting, rocking or wobbling and inadvertently striking the apparatus, such as the grinding wheels, which just performed a work operation on such article. If, for example, the article is a glass viewing panel for a cathode ray or television picture tube, such panel having a depending skirt position whose bottom annular surface was just ground in preparation for sealing to a funnel member for such a tube, rocking or wobbling movement of the viewing panel as it was being picked up or removed from the grinding apparatus or wheels could cause the outer peripheral rim of said annular surface to strike such apparatus or wheels and, thereby, chip, crack or fracture said rim, said annular surface, or said depending skirt portion. As previously discussed, said locking or clamping of the vacuum chuck is effective until the vacuum or negative pressure supplied to shaft 38 is sufficiently reduced or terminated following the transfer of the article from the work-performing apparatus or grinding wheels to another location or work station where the article is again set down or a suitable support or supporting apparatus such as a table, platform, or conveyor belt.

The previously mentioned pad 21 is preferably employed so that, if the surface of an article to be contacted has a convex curvature such that the downward axial force supplied to shaft 38 may be sufficiently high that said curved convex surface of the article may be contacted by the lower surface of member 17 of vacuum cup assembly 12 to thereby cause damage to such surface, such pad, when provided, would prevent such contact and said curved surface would instead contact the lower surface of the pad. The vacuum channels such as 21b in pad 21 permit negative pressure or vacuum to be supplied from passage 21a in such pad and through such channels to the inner periphery of vacuum cup lip 14 and brim 15 thereof. If the channels such as 21b are not provided, the center part of a sufficiently convexly curved surface of an article to be picked up may contact the lower end of vacuum passage 21a, or an annular area of the lower surface of pad 21 surrounding such lower end, and thereby interrupt or prevent the supplying of vacuum or negative pressure to a sufficient size area of said curved surface of said article to accomplish the picking up of the article.

Although there is herein shown and described only one embodiment of a vacuum chuck embodying the invention, it will be understood that such is not to be considered in any way limiting but that various changes and modifications may be made therein within the scope of the appended claims without departing from the spirit and purview thereof.

I claim:
1. A vacuum chuck for contacting a relatively flat or somewhat curved surface of an article such as a face plate surface of a viewing panel for a cathode ray tube and for handling such an article, such chuck comprising, in combination:
  I. a generally horizontally extending and circular vacuum cup assembly embodying a center passage extending vertically therethrough and including a circular outer member of a resilient material having a pendant annular lip with a lower brim for contacting said surface;
  II. a support member for said vacuum cup assembly, such member including;

A. a lower horizontally extending flange portion secured to the upper part of said vacuum cup assembly for support thereof; and
B. a center and generally vertically extending bowl shaped portion with an outer curved surface having a geometric configuration of a center segment of a sphere and embodying in the bottom wall thereof,
   a. a vertically extending center passage coaxial with and having its lower end joining the upper end of said center passage embodied in said vacuum cup assembly;
   b. a circular cavity coaxial with and of a somewhat larger diameter than said center passages with the lower end of such cavity joining with the upper end of said center passage embodied in said bottom wall, and
   c. a semispherical cavity having an open horizontal upper end of a larger diameter than said circular cavity and a truncated lower end joining with the upper end of the circular cavity with the centers of such upper and lower ends coaxial with the vertical centerline of the circular cavity;
III. a horizontally disposed annulus having an inner surface curvingly tapering downward correspondingly and complemental to a part of said outer surface of said bowl shaped portion of said support member, such inner surface and such part of said outer surface being at times in contact with each other for support of the support member and said vacuum cup assembly;
IV. a support member for said annulus, such member including;
   A. an upper horizontally extending flange portion secured to the upper surface of said annulus for support thereof; and
   B. a center and somewhat downwardly extending portion having a semispherical lower part with a geometric outer configuration corresponding and complemental to said semispherical cavity, such lower part extending into such cavity and at times cooperative with the surface defining the limits of the cavity to provide therewith a ball-and-socket joint arrangement, and said center portion embodying,
      a. a circular center cavity extending upwardly in said semispherical lower part with the opening into such cavity generally corresponding in diameter to the opening into said circular cavity in said bowl shaped portion of said assembly support member such openings facing each and the vertical centerlines of the cavities being coaxial,
      b. an intermediate size center passage extending upwardly substantially through said center portion of said annulus support member, such passage joining at its lower end with the upper end of said circular cavity in such center portion coaxially therewith and having a diameter larger than the previously mentioned passages but substantially smaller than said circular cavities, and
      c. a short length passage extending upwardly through the remainder of said center portion of said annulus support member, such passage joining at its lower end with the upper end of said intermediate size passage coaxially therewith, the line of junction of such passages providing a shoulder at the upper end of the intermediate size passage;
V. a vertically disposed rotational shaft embodying a vacuum passage extending longitudinally therethrough,
VI. means for attaching the lower end of said shaft and said center portion of said annulus support member to each other with said passage in said shaft in axial alignment with said short length passage in such support member;
VII. a resilient circular plug snugly disposed in said circular cavities, such plug embodying a vertical center passage corresponding in diameter to said intermediate size passage;
VIII. a compressible helical coil spring disposed in said intermediate size passage and said center passage in said plug, the upper end of such spring bearing against said shoulder at the upper end of the intermediate size passage and the lower end of the spring bearing against an annular area of the surface surrounding the upper end of said passage embodied in said bottom wall of said center bowl shaped portion of said vacuum cup assembly support member; and
IX. means coupling said annulus support member with said vacuum cup assembly support member for imparting rotation to the latter member and thereby to said vacuum cup assembly in correspondence with any rotation of said rotational shaft.

2. A vacuum chuck in accordance with claim 1 and in which said vacuum cup assembly further includes a circular pad of a reilient material secured to the bottom surface of such assembly and extending radially outward to contact an inner periphery of said annular lip of said resilient outer member of the assembly, such pad embodying a vertical center passage whose upper end joins with the lower end of said center passage of said vacuum cup assembly.

3. A vacuum chuck in accordance with claim 1 and in which said outer curved surface of said bowl shaped portion of said assembly support member and the curved surface of the wall defining the limits of said semispherical cavity in such support member have a geometrically common center point.

4. A vacuum chuck in accordance with claim 2 and in which said outer curved surface of said bowl shaped portion of said assembly support member and the curved surface of the wall defining the limits of said semispherical cavity in such support member have a geometrically common center point.

5. A vacuum chuck in accordance with claim 2 and in which said pad embodies in its lower surface a plurality of channels extending outwardly from said center passage in such pad, the inner ends of said channels connecting with such center passage and the outer ends of such channels connecting with the outer periphery of the pad.

6. A vacuum chuck in accordance with claim 4 and in which said pad embodies in its lower surface a plurality of channels extending outwardly from said center passage in such pad, the inner ends of said channels connecting with such center passage and the outer ends of such channels connecting with the outer periphery of the pad.

7. A vacuum chuck for contacting a somewhat convex surface of each of a plurality of similar articles and picking up each such article for handling thereof, such chuck comprising, in combination;

A. a generally horizontally extending vacuum cup assembly including an outer member of a resilient material having a pendant annular lip with a circular lower brim for contacting one of said convex surfaces, such assembly embodying in the vicinity of the center thereof a vacuum passage extending therethrough in a generally vertical direction;

B. a vertical rotational shaft embodying therein a vertical vacuum passage, and

C. an arrangement of parts coupling said assembly with the lower end of said shaft in a generally centered relationship with each other and with said vacuum passages in generally vertical alignement along a centerline of such passages, such arrangement including;

I. an outer ball-and-socket joint gimbaling means for at times supporting said vacuum cup assembly while locking the assembly against movement by a preselected amount of locking force;

II. an inner ball-and-socket joint vertically between said lower end of said shaft and said vacuum cup assembly, such joint for maintaining said centered relationship while permitting said assembly to rock when a lower part of said vacuum cup assembly contacts with said convex surface and such assembly bears downwardly with an amount of force sufficient to overcome said preselected amount of locking force; and III. means for keying said parts of said coupling arrangement to each other to impart any rotational motion of said shaft to said vacuum cup assembly;

D. and a plurality of vacuum passages hermetically embodied in said parts of said arrangement thereof, such passages hermetically joining the lower end of said vacuum passage embodied in said shaft with the upper end of said passage embodied in said vacuum cup assembly.

8. A vacuum chuck in accordance with claim 7 and in which the curved surfaces of said outer ball-and-socket joint gimbaling means and of said inner ball-and-socket joint have geometric center points which coincide with said centerline of said passages.

9. A vacuum chuck in accordance with claim 7 and in which said vacuum cup assembly further includes on its lower surface a pad of a resilient material having a center vacuum passage whose upper end joins with the lower end of said vacuum passage in said assembly, such pad including in its lower surface a plurality of vacuum channels connecting said center vacuum passage of the pad with the outer perimeter of the pad.

10. A vacuum chuck in accordance with claim 8 and in which said vacuum cup assembly further includes on its lower surface a pad of a resilient material having a center vacuum passage whose upper end joins with the lower end of said vacuum passage in said assembly, such pad including in its lower surface a plurality of vacuum channels connecting said center vacuum passage of the pad with the outer perimeter of the pad.

* * * * *